United States Patent [19]

Blackburn

[11] 4,154,382
[45] May 15, 1979

[54] BICYCLE RACK

[76] Inventor: James R. Blackburn, 2071 Rosswood Dr., San Jose, Calif. 95124

[21] Appl. No.: 890,298

[22] Filed: Mar. 27, 1978

[51] Int. Cl.² .............................................. B62J 7/04
[52] U.S. Cl. ....................................... 224/39; 224/41
[58] Field of Search ..................... 224/39, 41, 40, 37, 224/38, 30 R, 32 R, 32 A; 280/289 R, 289 A, 202

[56] References Cited

U.S. PATENT DOCUMENTS

| 1,030,844 | 6/1912 | Howell | 224/39 R UX |
| 3,948,424 | 4/1976 | Hunn et al. | 224/41 |

FOREIGN PATENT DOCUMENTS

| 100785 | 8/1925 | Austria | 224/40 |
| 11606 | 4/1956 | Fed. Rep. of Germany | 224/39 |
| 682267 | 5/1930 | France | 224/39 R |
| 2309392 | 11/1976 | France | 224/38 |
| 13166 of | 1897 | United Kingdom | 224/40 |

Primary Examiner—Robert J. Spar
Assistant Examiner—Jerold M. Forsberg
Attorney, Agent, or Firm—Schatzel & Hamrick

[57] ABSTRACT

A bicycle rack including an elongated load support frame, a U-shaped main strut attached to a mid-length portion of the support frame so that its two legs extend downwardly therefrom, a substantially V-shaped lateral bracing strut attached to an end portion of the support frame so that its two legs extend downwardly to attach to respective legs of the main strut, and a U-shaped stiffening strut attached proximate the other end portion of the support frame so that its two legs extend downwardly to attach to respective legs of the main strut, and an elongated bracket to connect the frame of the rack to the bicycle.

7 Claims, 5 Drawing Figures

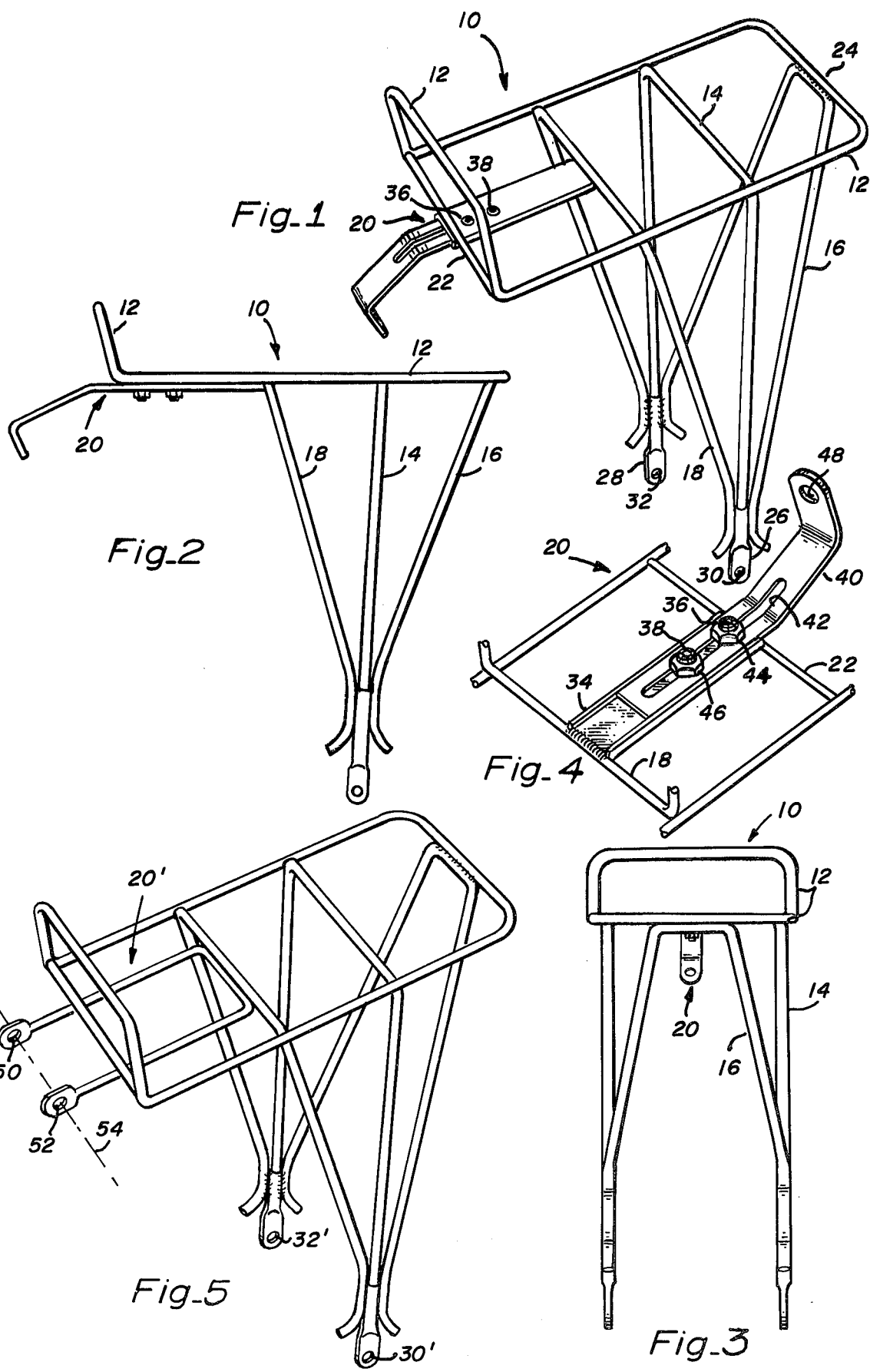

BICYCLE RACK

BACKGROUND OF THE INVENTION

1. Field of the Invention

This invention relates generally to bicycle accessories and more particularly to load supporting or carrying racks which can be rigidly attached to a bicycle.

2. Description of the Prior Art

Modern, light-weight English style bicycles are clean and inexpensive machines for efficiently transporting a person between dry land destinations. Furthermore, bicycling is an extremely healthy pastime, and is noted for improving the stamina, wind and cardio-vascular efficiency of those partaking the sport. Because of these and other advantages, many people are finding it increasingly attractive to use bicycles for around-town commuting and for extended cross-country excursions.

Bicycle riding, however, does have certain drawbacks. For example, a cross-town commuter typically would carry an outer garment, lunch, or even a briefcase to work. A problem encountered is that the commuter cannot both carry those objects in his hands and still ride his bicycle with any degree of efficiency.

A partial solution to this problem has been to attach a basket or rack to the bicycle in or upon which loads may be disposed. However, in the past, baskets and racks have generally been heavy and cumbersome accessories which detrimentally effect the riding responsiveness of the bicycle.

Thus, a demand was created for a light-weight rack that was sufficiently strong to carry normally heavy loads. An example of a rack that was developed in response to this demand is the well known Blackburn carrier which included an elongated load support frame, a U-shaped main strut attached to a mid-portion of the support frame with its legs extending downwardly therefrom, a second U-shaped strut which was attached near one end of the support frame so that its legs extended downwardly to attach to terminal portions of respective legs of the main strut, a bent U-shaped stiffening strut attached near the other end of the support frame with its legs extending downwardly so that bent portion of the leg extends down along a good deal of the length of the main strut, and a non-adjustable bracket for attaching the frame to a bicycle.

The Blackburn rack had many advantages over previous bicycle racks, the most important being that the triangular strut configuration imparted a very high degree of stiffness and strength to the rack without adding much weight.

A problem that the prior art does not address is how to adjust the attachment of the rack to the bicycle in order to custom fit the rack to different bicycle types and sizes.

SUMMARY OF THE INVENTION

In view of the disadvantages of prior art bicycle racks it should be apparent that a major object of the present invention is to provide a bicycle rack which is light-weight, strong and rigid.

Another objective of this invention is to provide a bicycle rack that is adjustable in order to custom fit many sizes and styles of bicycles.

Another, and very important, object of this invention is to provide a bicycle rack with lateral bracing to inhibit the rack from twisting due to uneven side-to-side loading.

Briefly, a preferred embodiment of the present invention includes an elongated load support frame, a substantially U-shaped main strut attached to a mid-length portion of the support frame with its two legs extending downwardly therefrom, a substantially V-shaped lateral bracing strut attached to an end of the support frame so that its two legs extend downwardly to attach to respective terminal portions of the legs of the main strut, a substantially U-shaped stiffening strut attached near the other end of the frame so that its two legs extend downwardly to attach to respective terminal portions of the legs of the main strut, and an elongated connecting bracket having an end attached to the rack and having its other end adapted to connect to a bicycle.

In view of the preceeding brief description, it may be noted that the triangular strut configuration of my invention will not cause bending moments in the main strut because the ends of the legs of both the stiffening and lateral bracing strut are attached to the same terminal portions of the legs of the main strut. Also the rack of my invention is bracked against lateral rotation by the V-shaped lateral bracing strut. Because of these strut design improvements, my rack may be constructed from extremely light-weight materials, such as one of the aluminum alloys, and still be stong and rigid.

A further novel feature of the present invention is the adjustable connecting bracket which permits a more perfect fitting of the rack of a particular bicycle.

These and other objects and advantages of my invention will no doubt become apparent to those of ordinary skill in the art after studying the several figures of the drawing and reading the following detailed description.

IN THE DRAWING

FIG. 1 is a perspective view showing a bicycle rack in accordance with my present invention;

FIG. 2 is a side elevational view which further illustrates the rack shown in FIG. 1;

FIG. 3 is a rear elevational view again further illustrating the rack shown in FIG. 1;

FIG. 4 is a partial, inverted perspective view of the connecting bracket assembly partially visible in FIGS. 1, 2 and 3; and FIG. 5 is a perspective view of an alternative construction for a bicycle rack in accordance with the present invention.

DETAILED DESCRIPTION OF THE PREFERRED EMBODIMENT

Referring in general to FIGS. 1, 2 and 3 of the drawing, a bicycle rack 10 is shown to include an elongated load support frame 12, an inverted, U-shaped main strut 14, an inverted, substantially V-shaped lateral bracing strut 16, an inverted, U-shaped stiffening strut 18, and an adjustable connecting bracket assembly 20.

It is apparent from the drawing that substantially U-shaped struts 14 and 18 are not classically U-shaped, but rather have a straight base portion from which two legs depend. Similarly, substantially V-shaped strut 16 does not appear to be perfectly V-shaped but rather has a short, straight base portion and two divergingly depending legs. Furthermore, struts 16 and 18 are bent near the terminal portions of their legs for reasons that will be discussed subsequently.

A portion of support frame 12 is bent upwardly as shown. Usually when the rack is attached to a bicycle this bent portion faces forwardly so as to create a barrier or stop for preventing loads from shifting in that direction.

A cross-bar 22 is attached across the width of frame 12 along the line of the bend to help strengthen and rigidize the frame structure. The cross-bar further serves the purpose of partially supporting connection bracket 20, as will be discussed in greater detail later. Frame 12 is preferably constructed from a single rod of a light-weight metal such as an aluminum or magnesium alloy, which is bent into the generally rectangular shaped configuration shown in the figures by metal-bending techniques well known to those skilled in the art. The ends of the metal rod meet at a juncture 24 where they are attached together.

In FIG. 1 it may be noted that the base portion of main strut 14 is substantially the same in width as the width of frame 12. The ends of the base portion are rigidly attached to the frame so that the two legs of the strut extend downwardly therefrom. As may be seen best in FIG. 2, the main strut is angled slightly towards the front end of the frame.

A sleeve 26 is disposed over the end of one of the legs of the main strut and a sleeve 30 is disposed over the end of the other leg. An eyelet 26 is formed through the flattened end portion of sleeve 30 and an eyelet 28 is formed through the flattened end portion of sleeve 32. The eyelets are provided so that bolts, not shown, may be inserted through them and through corresponding eyelets or apertures formed on a bicycle. Nuts may then be tightened on the ends of the bolts to firmly attach the main strut to the bicycle. The sleeves are flattened at their ends to mate with corresponding flattened portions on the bicycle.

Lateral bracing strut 16 has its short base portion attached to an end portion of frame 12 proximate juncture point 24. The base portion of strut 16 is centered relative the longitudinal axis 25 of elongated frame 12. The diverging legs of the bracing strut extend downwardly from the frame to contact and attach to terminal portions of respective legs of the main strut and the upper portions of sleeves 26 and 28. The very ends of strut 16 are bent or flared back from the main strut as shown in the figures.

The way that lateral bracing strut 16 prevents rotation of frame 12 about its longitudinal axis is belived to be as follows. If the frame is unevenly loaded with gear or is otherwise subjected to unbalanced forces, at least a part of the unbalanced loading would manifest itself as a force causing a rotation of the frame about its longitudinal axis 25. This rotational force tends to flex straight legged struts, such as struts 14 and 18. However, lateral bracing strut 16, because its legs angle towards axis 25, resists rotation to a greater degree than the other struts.

Stiffening strut 18 is also a substantially U-shaped member and is used to further strengthen the rack. The strut has the ends of its base portion attached to the frame and has its two substantially parallel legs extend downwardly to contact and attach to respective legs of the main strut and to the sleeves. The very ends of the legs of strut 18 are bent back from main strut 14 in a manner likened to the bending of the end of the legs of strut 16.

The three struts and the two sleeves are preferably constructed from the same light-weight aluminum alloy as support frame 12. The struts may be made from rod stock that is cut, bent, or otherwise formed into shape. The sleeves may be made by selecting a rod of slightly greater diameter than that used for the struts, flattening an end of each of the short rods, forming the bolt holes 30 and 32 through the flattened ends and drilling axial bores into the unflattened ends of the sleeves to receive the ends of the legs of main strut 14.

The structure of connecting bracket assembly 20 is best seen in the partial perspective view of FIG. 4 where channel stock, seen here as having a "C" shaped cross section, is used to form a member 34 which is attached between bar 22 and the base portion of strut 18. Two holes, not shown, are formed through member 34 through which a pair of bolts 36 and 38 (also seen in FIG. 1) are disposed.

An elongated connecting strip 40, which is slightly less wide than the inside width of channel member 34, is provided with an elongated slot 42 through which the ends of bolts 36 and 38 protrude. Nuts 44 and 46 are threaded onto the ends of the bolts to complete the attachment of the connecting strip to member 34.

As may be seen in the figure, strip 40 is twice bent so that its forwardly projecting end portion is angularly positioned for attachment to a bicycle. A hole 48 is provided in the end of strip 40 so that a bolt or other fastener may be inserted through it and attached to the bicycle.

Member 34 is preferably constructed of the same aluminum alloy as the rest of the rack. Strip 40 is preferably constructed from a strong flexible material, such as stainless steel. Bolts 36 and 38 are preferably of the Allenhead type and nuts and 44 and 46 are lock nuts.

When the nuts are only loosely threaded onto the end of bolt 36 and 38, strip 40 may slide along member 34 until a bolt shaft engages an end of recess 42. When the nuts are firmly tightened on the bolts, strip 40 is immobilized by being clamped between the nuts and member 34.

All of the aforementioned attachments between the frame, struts, connecting bar, sleeves and other members are preferably accomplished by welding. The "heli-arc" weld is generally considered the strongest and most reliable method for joining the aluminum alloys used for the construction of the members of the preferred embodiment.

It is also possible to attach the various members together with fasteners such as rivets, nuts and bolts, and the like. Fasteners, however, are inferior in strength to welds and add additional weight to the rack.

The rack illustrated in FIG. 1 is attached to the bicycle with bolts fastened through holes 30, 32 and 48. More specifically, when the rack is to be attached over the rear wheel of a bicycle, the rack is positioned over the wheel so that the flattened portions of the sleeves 26 and 28 are aligned with apertures on the bicycle that are located near the hub of the rear wheel. Bolts are inserted through holes 30 and 32 and the apertures on the bicycle and nuts are threaded onto their ends. Hole 48 is likewise aligned with an aperture formed through a portion of the bicycle located near the seat. A bolt is disposed through the hole and the aligned aperture and the nut is firmly fastened onto its end. The frame of the rack can be leveled by hand when bolts 36 and 38 are loosened and affixed in place by retightening those bolts.

In use, a load is either supported on top of or is hung down from frame 12. The base portions of struts 14 and 18, and the upper surface of member 34 help to define a load supporting surface to prevent smaller object from falling through the frame. A load disposed on top of the frame may be secured by an elastic strap having its ends hooked over the bent back portions of legs 16 and 18.

An alternate embodiment of the present invention is illustrated in FIG. 5. In this embodiment a non-adjustable bracket 20' replaces the adjustable bracket assembly 20 of the preferred embodiment. Bracket 20' is a substantially U-shaped member having a straight base portion and two forwardly extending straight leg portions. The angle between the leg portions and the base portion is about 90 degrees.

The ends of the leg portion of bracket 20' are flattened and provided with a pair of substantially aligned holes 50 and 52, as is indicated by center line 54.

The method of attachment of this alternative rack to a bicycle is virtually the same as for the preferred rack, except that a pair of bolts are inserted through holes 50 and 52 for attachment to the bicycle in contrast to the single bolt of the preferred embodiment. It is apparent that this alternative rack cannot be easily adjusted to a particular bicycle style or size.

Although the present invention was described in the light of two particular embodiments, it will be appreciated that certain modifications and permutations are possible.

For instance, instead of being provided with an elongated slot, connecting strip 40 could be provided with a plurality of linearly aligned holes that are separated from each other by the same distance as the distance between bolts 36 and 38. The connecting strip could then be adjusted by increments until the rack fits the particular bicycle to which it is being attached.

It is therefore my intention that the appended claims cover all such modifications and permutations as fall within the true spirit and scope of my invention.

What is claimed is:

1. A bicycle rack comprising:
   an elongated substantially horizontal article support frame means having an upper side, a lower side, a forward end and a rearward end, said frame means being symmetrical about a longitudinal axis extending between its ends;
   a substantially U-shaped main strut having a base portion and two substantially parallel leg portions depending therefrom;
   means rigidly attaching the base portion of said main strut to said frame means at points separated from said rearward end by approximately one-third the length of said frame means such that the two leg portions of the main strut extend downwardly from the lower side of said frame means;
   a substantially U-shaped stiffening strut having a base portion and two substantially parallel leg portions depending therefrom;
   means rigidly attaching the base portion of said stiffening strut to said frame means at points separated from said forward end by approximately one-third the length of said frame means such that the two leg portions of the stiffening strut extend downwardly from the lower side of said frame means, the end sections of said leg portions of said stiffening strut being rigidly attached to respective end sections of the leg portions of said main strut;
   a substantially V-shaped lateral bracing strut, having a base portion and two diverging leg portions, where the base portion of said V-shaped strut is shorter than the base portions of either said main strut or said stiffening strut;
   means rigidly attaching the base portion of said lateral bracing strut to said rearward end of said frame means so that it is symmetrical about said longitudinal axis and so that the two leg portions of the lateral bracing strut extend downwardly and laterally outwardly from the lower side of said frame means, the end sections of the leg portions of said lateral bracing strut being rigidly attached to respective end sections of the leg portions of the main strut;
   connecting bracket means attached to said forward end of said support frame means and to the base portion of said stiffening strut for connecting said frame means to a first part of a bicycle; and
   means for attaching the ends of the leg portions of said main strut to respective second and third parts of said bicycle,
   whereby the angled legs of the lateral bracing strut inhibit the rotation of the frame means about said longitudinal axis as caused by unevenly balanced loads disposed on said frame means, and the attachment of all three struts together at their ends creates a strong, rigid triangular strut design that minimizes bending moments in the leg portions of the struts as caused by the weight of the load disposed on said frame means, and wherein the teminal ends of the leg portions of said lateral bracing and said stiffening struts are flared away from the end sections of said main strut such that a strap or rope for securing a load to the rack may be looped or tied around the flared end portion.

2. A bicycle rack as recited in claim 1 wherein said connecting bracket includes a substantially U-shaped member having a base portion and two substantially parallel leg portions extending therefrom, the base portion of the bracket being attached to the base portion of said stiffening strut, the mid-length sections of the leg portions of the bracket being attached to said forward end of said frame means and the ends of the leg portions of the connecting bracket extending beyond said forward end for attachment to said first part of said bicycle.

3. A bicycle rack as recited in claim 1 wherein said connecting bracket includes
   an elongated unitary support member rigidly attached at one end to said forward end of said frame means and rigidly attached at its other end to the base portion of said stiffening strut,
   an elongated connecting member having a first end extending beyond said forward end of said frame means for attachment to said first part of said bicycle, and
   means adjustably attaching said connecting member to said support member whereby the degree of extension of the first end of said connecting member beyond said forward end of said frame means may be varied in order to allow said frame means to be leveled.

4. A bicycle rack as recited in claim 3 wherein said support member is channel-shaped and opens downwardly from the lower side of said frame means, and said connecting member slides within the channel of said support member.

5. A bicycle rack as recited in claim 4 wherein said support member is provided with at least one bolt hole, said connecting bracket is provided with an elongated slot aligned with said bolt hole, and said means adjustably attaching said connecting member to said support member includes a bolt disposed through said bolt hole and said slot and a nut threaded onto the end of said bolt, whereby when said nut is tightened upon said bolt, the connecting member and support member are tightly clamped together, and when said nut is loosened upon said bolt said connecting member is free to slide along the length of said support member until the shaft of said bolt engages an end of said slot.

6. A bicycle rack as recited in claim 1 wherein a portion of said frame means proximate said forward end is bent upwardly from the upper surface of said frame means to prevent a load disposed upon said frame means from shifting in the direction of said forward end.

7. A bicycle rack as recited in claim 1 wherein said means for attaching the legs of the main strut to said bicycle include
- a first elongated sleeve member having a flattened first end provided with a bolt hole, and having an axial bore formed into a second end wherein the end of a first leg portion of the main strut is secured, and
- a second elongated sleeve member having a flattened first end provided with a bolt hole, and having an axial bore formed into a second end wherein the end of a second leg portion of the main strut is secured,
- whereby said first and second sleeve members may be bolted to said second and third parts of said bicycle, respectively, to attach the legs of the main strut to the bicycle.

* * * * *

REEXAMINATION CERTIFICATE (498th)
United States Patent [19]
Blackburn

[11] B1 4,154,382
[45] Certificate Issued  May 6, 1986

[54] BICYCLE RACK

[76] Inventor: James R. Blackburn, 2071 Rosewood Dr., San Jose, Calif. 95124

Reexamination Request:
No. 90/000,206, May 27, 1982

Reexamination Certificate for:
Patent No.: 4,154,382
Issued: May 15, 1979
Appl. No.: 890,298
Filed: Mar. 27, 1978

[51] Int. Cl.$^4$ .............................................. B62J 7/04
[52] U.S. Cl. ....................................... 224/39; 224/41; 224/32 A
[58] Field of Search ............... 224/30 R, 32 R, 32 A, 224/38–41, 37

[56] References Cited
U.S. PATENT DOCUMENTS

| | | | |
|---|---|---|---|
| 460,332 | 9/1891 | Coates | 224/39 |
| 1,030,844 | 6/1912 | Howell | 224/39 X |
| 3,786,972 | 1/1974 | Alley | 224/31 |
| 3,948,424 | 4/1976 | Hunn et al. | 224/41 |
| 4,174,795 | 11/1979 | Jackson et al. | 224/39 X |

FOREIGN PATENT DOCUMENTS

| | | | |
|---|---|---|---|
| 11606 | 4/1956 | Fed. Rep. of Germany | 224/39 |
| 2309392 | 11/1976 | France | 224/38 |

OTHER PUBLICATIONS

Advertising Sheet of JCI Bicycle Products of a "Cruiser Carrier".
Copy of Advertising in Bicycle Dealer Showcase, p. 45, Oct. 1980.
Photos of Patented Blackburn Rack and Prior Art Blackburn Rack.
Bicycling, Mar. 1977, Advertisement by "Bike Warehouse," Youngstown, Ohio.
Bicycle Journal, Aug. 1978, p. 34, Gus Betat and Son Advertisement.
Advertising Flier for "The Blackburn Rack".
Advertising Flier for JCI Bicycle Products for a "Touring Carrier".
Bicycling, Sep. 1976, p. 50 "Earlier Blackburn Rack" Advertisement.

*Primary Examiner*—Steven M. Pollard

[57] ABSTRACT

A bicycle rack including an elongated load support frame, a U-shaped main strut attached to a mid-length portion of the support frame so that its two legs extend downwardly therefrom, a substantially V-shaped lateral bracing strut attached to an end portion of the support frame so that its two legs extend downwardly to attach to respective legs of the main strut, and a U-shaped stiffening strut attached proximate the other end portion of the support frame so that its two legs extend downwardly to attach to respective legs of the main strut, and an elongated bracket to connect the frame of the rack to the bicycle.

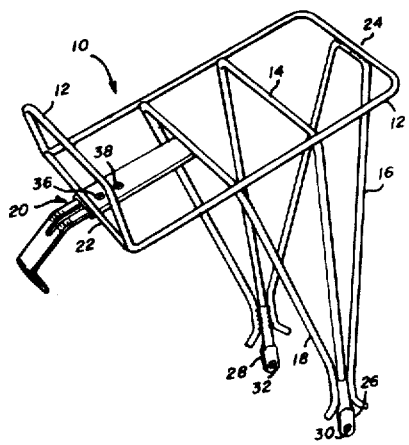

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 31–51:

Thus, a demand was created for a light-weight rack that was sufficiently strong to carry normally heavy loads. An example of a rack that was developed in response to this demand is the well known Blackburn carrier which included an elongated load support frame, a U-shaped main strut attached to a mid-portion of the support frame with its legs extending downwardly therefrom, a second U-shaped strut which was attached [near] *at* one end of the support frame so that its legs extended downwardly to attach to terminal portions of respective legs of the main strut, a [bent U-shaped] *pair of tortiously shaped and welded together members which form forward* stiffening strut *means* attached near the other end of the support frame [with its legs] *and having bent legs* extending downwardly so that *the* bent portion of the leg *are affixed to and* extend[s] down along a [good deal] *substantial portion* of the length*s* of the *legs of the* main strut, and a non-adjustable bracket for attaching the frame to a bicycle.

The Blackburn rack had many advantages over previous bicycle racks the most important being that the triangular strut configuration imparted a very high degree of stiffness and strength to the rack without adding much weight. *However, it had the disadvantage that heavy loads applied to the front portion of the rack tended to cause the bent legged forward strut to apply deforming forces to the legs of the main strut and thus tended to weaken the structure.*

AS A RESULT OF REEXAMINATION, IT HAS BEEN DETERMINED THAT:

Claim 1 is cancelled.

Claims 2, 3, 6 and 7 are determined to be patentable as amended.

Claims 4 and 5 dependent on an amended claim, are determined to be patentable.

New claims 8-10 are added and determined to be patentable.

2. A bicycle rack as recited in claim [1] *8* wherein said connecting bracket includes a substantially U-shaped member having a base portion and two substantially parallel leg portions extending therefrom, the base portion of the bracket being attached to the base portion of said stiffening strut, the mid-length sections of the leg portions of the bracket being attached to said forward end of said frame means and the ends of the leg portions of the connecting bracket extending beyond said forward end for attachment to said first part of said bicycle.

3. A bicycle rack as recited in claim [1] *8* wherein said connecting bracket includes an elongated unitary support member rigidly attached at one end to said forward end of said frame means and rigidly attached at its other end to the base portion of said stiffening strut, an elongated connecting member having a first end extending beyond said forward end of said frame means for attachment to said first part of said bicycle, and means adjustably attaching said connecting member to said support member whereby the degree of extension of the first end of said connecting member beyond said forward end of said frame means may be varied in order to allow said frame means to be leveled.

6. A bicycle rack as recited in claim [1] *8* wherein a portion of said frame means proximate said forward end is bent upwardly from the upper surface of said frame means to prevent a load disposed upon said frame means from shifting in the direction of said forward end.

7. A bicycle rack as recited in claim [1] *8* wherein said means for attaching the legs of the main strut to said bicycle include a first elongated sleeve member having a flattened first end provided with a bolt hole, and having an axial bore formed into a second end wherein the end of a first leg portion of the main strut is secured, and a second elongated sleeve member having a flattened first end provided with a bolt hole, and having an axial bore formed into a second end wherein the end of a second leg portion of the main strut is secured, whereby said first and second sleeve members may be bolted to said second and third parts of said bicycle, respectively, to attach the legs of the main strut to the bicycle.

*8. A bicycle rack for attachment to the frame of a bicycle in a straddling relationship to the rear wheel thereof, comprising:*

*an elongated substantially planar and horizontally extending article support frame means having an upper side, a lower side, a forward end and a rearward end, said frame means being rigid, generally rectangular in plan and symmetrical about a longitudinal axis extending between its ends;*

*a substantially U-shaped main strut having a base portion and two straight, substantially parallel leg portions depending therefrom and terminating in lower end sections;*

*means rigidly attaching the base portion of said main strut to said frame means at points separated from said rearward end by approximately one-third the length of said frame means such that the two leg portions of the main strut extend downwardly from the lower side of said frame means;*

*a substantially U-shaped forward stiffening strut having a base portion and two straight, substantially parallel leg portions depending therefrom and terminating in lower end sections;*

*means rigidly attaching the base portion of said forward stiffening strut to said frame means at points separated from said forward end by approximately one-* third the length of said frame means such that the two leg portions of the stiffening strut extend downwardly from the lower side of said frame means;

a substantially V-shaped lateral bracing strut having a base portion and two straight diverging leg portions depending therefrom and terminating in lower end sections, where the base portion of said V-shaped strut is shorter than the base portions of either said main strut or said stiffening strut;

means rigidly attaching the base portion of said lateral bracing strut to said rearward end of said frame means so that it is symmetrical about said longitudinal axis and so that the two leg portions of the lateral bracing strut extend downwardly and laterally outward from the lower side of said frame means;

connecting bracket means attached to said forward end of said frame means and to the base portion of said forward stiffening strut for connecting said frame means to a first part of a bicycle frame;

means for attaching the ends of the leg portions of said main strut to respective second and third parts of said bicycle;

means for rigidly attaching the respective lower end sections of the leg portions of said forward stiffening strut and said lateral bracing strut to corresponding lower end sections of the leg portion of said main strut such that on each side of said frame means one of the leg portions of said forward stiffening strut and one of the leg portions of said lateral bracing strut combine with a portion of the plane of said frame means to define a first triangle, said one of the leg portions of said forward stiffening strut and one of said leg portions of said main strut combine with a portion of the plane of said frame means to define a second triangle, said one of said leg portions of said main strut and said one of said leg portions of said lateral bracing strut combine with a portion of the plane of said frame means to define a third triangle, and each of said one leg portions intersect the plane of said frame means at the vertices of a fourth triangle forming the base of an inverted tetrahedral structure including said first, second and third triangles, the tetrahedral structures on each side of said frame means providing strong, rigid, sway resisting supports for loads carried on said frame means, whereby the angled legs of the lateral bracing strut inhibit the rotation of the frame means about said longitudinal axis as caused by unevenly balanced loads disposed on said frame means and the attachment of all three struts together at their lower end sections creates a strong, rigid triangular strut design that minimizes bending moments in the leg portions of the struts as caused by the weight of the load disposed on said frame means, and;

the distal extremities of the lower end sections of said lateral biasing and said stiffening struts being flared away from the end sections of said main strut such that a strap or rope for fastening a load to the rack may be looped or tied around the flared end portions.

9. A bicycle rack for supporting a load over the rear wheel of a bicycle comprising:

a rigid, rectangular and substantially horizontally disposed article support frame having an upper side, a lower side, a forward end, and a rearward end and having a connecting bracket means for attachment to a bicycle frame;

a first tetrahedral frame support structure formed by a first set of three straight legged struts which depend downwardly from three spaced apart points on the lower side of said article support frame and are rigidly joined together at their distal extremities to form the apex of said first tetrahedral frame support structure, said apex being attachable to the frame of said bicycle by attaching the lower end of the middle positioned strut to the bicycle near a rear wheel axle attachment point;

a second tetrahedral frame support structure formed by a second set of three straight legged struts which depend downwardly from three other spaced apart points on the lower side of said article support frame and are rigidly joined together to form the apex of said second tetrahedral support structure, said last mentioned apex being joined to the frame of said bicycle by attaching the lower end of the middle positioned strut to the bicycle near another rear wheel axle attachment point;

said first and second tetrahedral support structures comprised of: a substantially U-shaped main strut and stiffening strut, each having a base portion and two substantially parallel leg portions depending therefrom, a substantially V-shaped lateral bracing strut, having a base portion and two diverging leg portions, where the base portion of said V-shaped strut is shorter than the base portions of either of said main strut and stiffening strut extending downwardly from the lower side of said article support frame means, and said main strut base, portion being rigidly attached to said article support frame at points separated from said rearward end by approximately one-third the length of said article support frame, said stiffening strut base portion being rigidly attached to said article support frame at points separated from said forward end by approximately one-third the length of said article support frame, said lateral bracing strut base portion being rigidly attached to said rearward end of said article support frame, so that it is symmetrical about the longitudinal axis of said article support frame, said connecting bracket means attached to said forward end of said article support frame and to the base portion of said stiffening strut, and wherein the terminal ends of the end sections of the leg portions of said lateral and said stiffening struts are rigidly joined and flared away from the end sections of said main strut such that a strap or rope for securing a load may be looped or tied around the flared end portions whereby the first and second support structures inhibit motion of the support frame as caused by unevenly balanced loads disposed thereon and the attachment of the sets of struts at their ends creates a strong, rigid triangular strut design that minimizes bending moments in the leg portions of the struts as caused by the weight of the load disposed on said frame.

10. A bicycle rack comprising:

a rigid, elongated substantially horizontal article support frame means having an upper side, a lower side, a left side, a right side, forward and rearward frame elements, said frame means being substantially rectangular in shape and being symmetrical about a longitudinal axis extending between said forward and rearward frame elements;

connecting bracket means for attaching said forward frame element to a bicycle frame;

a first tetrahedrally configured support structure for supporting one side of said article support frame means, the base of said first support structure being formed by a portion of said article support frame means, and the apex of said first support structure depending below said article support frame means for attachment to one side of the bicycle frame proximate the rear wheel axle attachment bracket by attaching the lower end of the middle positioned strut to the bicycle frame, the downwardly depending edges of said first support structure being formed by three straight strut elements rigidly joined at their lower ends to form said apex, the upper ends thereof being rigidly joined to said article support frame means at three separated points, two of which lie along said right hand frame element at distances from said rearward frame element of approximately one-third and two-thirds of the length of said right hand frame element, and the third lying along said rearward frame at a distance from said right hand frame element of approximately one-third of the length of said rearward frame element; and a second tetrahedrally configured support structure for supporting said article support frame means, the base of said second support structure being formed by another portion of said article support frame means, the apex of said second support structure depending below said article support frame means for attachment to the other side of the bicycle frame proximate the other rear wheel axle attachment bracket by attaching the lower end of the middle positioned strut to the bicycle frame, the downwardly depending edges of said second support structure being formed by three straight strut elements rigidly joined together at their lower ends to form said apex, the upper ends thereof being rigidly joined to said article support frame means at three separated points, two of which lie along said left hand frame element at distances from said rearward frame element of approximately one-third and two-thirds of the length of said left hand frame element, and the third lying along said rearward frame element at a distance from said left hand frame element of approximately one-third of the length of said rearward frame element, said first and second tertrahedral support structures comprised of: a substantially U-shaped main strut and stiffening strut, each having a base portion and two substantially parallel leg portions depending therefrom, a substantially V-shaped lateral bracing strut, having a base portion and two diverging leg portions, where the base portion of said V-shaped strut is shorter than the base portions of either said main strut and stiffening strut extending downwardly from the lower side of said article support frame means, means rigidly attaching the base portion of said lateral bracing strut to said rearward end of said article support frame means so that it is symmetrical about said longitudinal axis, said connecting bracket means attached to said forward end of said support frame means and to the base portion of said stiffening strut, wherein the terminal ends of the leg portions of said lateral bracing and stiffening struts are flared away from the end sections of said main strut such that a strap or rope for securing a load to the rack may be looped or tied around the flared end portions whereby the first and second support structures inhibit motion of the support frame as caused by unevenly balanced loads disposed thereon and the attachment of the sets of struts at their ends creates a strong, rigid triangular strut design that minimizes bending moments in the leg portions of the struts as caused by the weight of the load disposed on said frame.

* * * * *